3,781,404
AMERICIUM RECOVERY FROM REDUCTION RESIDUES
William V. Conner, Nederland, and Stephen G. Proctor, Denver, Colo., assignors to the United States of America as represented by the United States Atomic Energy Commission
Filed May 18, 1972, Ser. No. 254,690
Int. Cl. C01g 65/00
U.S. Cl. 423—11                3 Claims

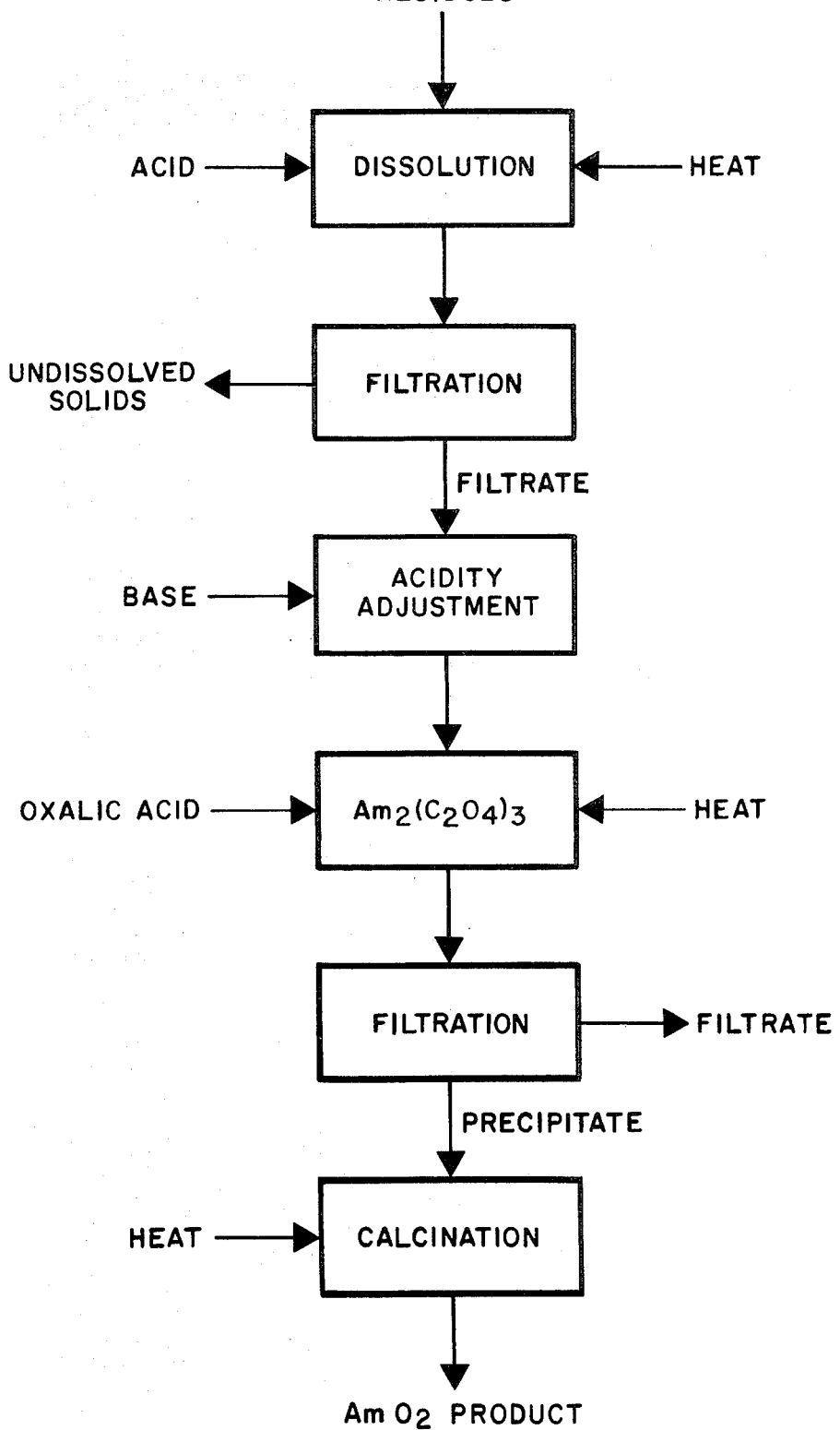

ABSTRACT OF THE DISCLOSURE

A process for separation and recovery of americium values from container or "bomb" reduction residues comprising dissolving the residues in a suitable acid, adjusting the hydrogen ion concentration to a desired level by adding a base, precipitating the americium as americium oxalate by adding oxalic acid, digesting the solution, separating the precipitate, and thereafter calcining the americium oxalate precipitate to form americium oxide.

BACKGROUND OF INVENTION

Americium (Am) bomb reduction residues are created in the calcium reduction of americium tetrafluoride ($AmF_4$) to metal in a sealed container or bomb. The residues may typically contain such salts as calcium fluoride ($CaF_2$), magnesium oxide (MgO), calcium chloride ($CaCl_2$) and calcium iodide ($CaI_2$). Prior to this invention, a satisfactory method for recovery of Am from the bomb reaction residues was not available. Although plutonium (Pu) values have been recovered from bomb reduction residues using either anion exchange or solvent extraction techniques, these methods may not work satisfactorily for Am because these processes rely on the extraction of tetravalent Pu ions and complexes from aqueous solutions. Since Am occurs in the trivalent state in aqueous solutions, unless oxidized to the penta- or hexa-valent states, processes suitable for Pu recovery are not felt satisfactory for Am recovery.

SUMMARY OF INVENTION

It is an object of this invention to provide a method for separating Am values from bomb reduction residues.

It is a further object of this invention to provide a novel process for recovering Am values from bomb reduction residues wherein Am recovery yields are in excess of 92% and generally better than 95%.

Various other objects and advantages will appear from the following description of this invention and the most novel features will be particularly pointed out hereinafter in connection with the appended claims. It will be understood that various changes in the details, materials, and steps of the process, which are herein described and illustrated in order to explain the nature of the invention, may be effected by those skilled in the art without departing from the scope of this invention.

The invention comprises, in brief, separating americium values from residues comprising dissolving the residues from the bomb reduction of $AmF_4$, adjusting the hydrogen ion concentration to from about 0.1 to about 0.3 N, adding oxalic acid ($C_2H_2O_4$) and effecting precipitation of the Am as americium oxalate [$Am_2(C_2O_4)_3$], separating the precipitate and thereafter calcining the Am precipitate to form americium oxide ($AmO_2$). In use of the term americium oxide, it should be understood that such may not be 100% pure but that there may be embodied therewith minor amounts of certain rare earths such as erbium, thulium, yttrium and ytterbium since the properties and reactions of the rare earths and Am are very similar.

DESCRIPTION OF DRAWING

The drawing is a flow diagram illustrating the steps of the process.

DETAILED DESCRIPTION

As shown in the drawing, Am values (i.e., Am material) may be separated in the form of $AmO_2$ from residues such as bomb reduction residues which may be dissolved in suitable acid such as from about 10 to about 15 M nitric acid. The residue containing acid may be heated to boiling for a sufficient length of time, such as about 2 hours, and the solution diluted with water to minimize or prevent formation of insoluble salts and then cooled to ambient temperature. Other acids, such as hydrochloric acid may be employed as well as different concentrations, as known within the skill of the art. It is important, however, that the acid used for dissolution of the residues be of sufficient strength to leave the solution at least about 6 M in hydrogen ion after the dissolution is complete. The insoluble precipitates fay be removed through a suitable procedure such as filtration, decantation or the like. The acidity of the filtrate may then be adjusted to a range of from about 0.1 to about 0.3 N $H^+$ with a suitable base such as ammonium hydroxide. Sodium or potassium hydroxides are not desired bases for this purpose since their use may cause large quantities of calcium and magnesium to precipitate out with the Am. The acid adjustment precedes the precipitation of the Am in order to prevent a high loss of Am to the filtrate. After the acidity adjustment step as shown in the drawing, an excess of oxalic acid may be added to the solution to precipitate the Am and leave the solution at about 0.1 M in oxalic acid. The resulting light tan precipitate and the solution may be digested by heating to 50° C. for about one hour and thereafter maintaining at ambient or room temperature for from about 8 to about 16 hours. After digesting for about 16 hours, the solution may be filtered to remove the americium oxalate precipitate which may then be calcined to $AmO_2$ at about 600° C. for about 4 to 6 hours.

The below table lists results of Am recoveries of five batches of bomb reduction residues. The total residue weight was 970 grams and contained 33.67 grams (3.5 weight percent) of Am-241. The product contained 32.18 grams of Am-241 for a 95.57 recovery. The Am product contained only 5500 parts per million (p.p.m.) calcium and 2 weight percent magnesium. The calcium and magnesium impurities were reduced to 2000 p.p.m. and 50 p.p.m., respectively with a second oxalate precipitation.

AMERICIUM RECOVERY FROM RESIDUES

| Batch number | Total solids weight (grams) | Americium weight in— Feed (grams) | Americium weight in— Product (grams) | Percent americium recovered |
|---|---|---|---|---|
| 1 | 180 | 6.61 | 6.53 | 98.8 |
| 2 | 210 | 6.94 | 6.45 | 92.9 |
| 3 | 220 | 9.12 | 8.82 | 96.7 |
| 4 | 210 | 4.78 | 4.46 | 93.3 |
| 5 | 150 | 6.22 | 5.92 | 95.25 |
| Total | 970 | 33.67 | 32.18 | 95.57 |

By way of further detailed explanation, in run No. 2, 210 grams of bomb reduction residues containing 6.94 grams of Am-241 were placed in a four liter beaker along with 1 liter of concentrated nitric acid. The slurry was agitated and heated to boiling for about two hours. The solution volume was then increased to about two liters with water to prevent the formation of insoluble salts as the solution cooled. After cooling, the solution was filtered to remove the undissolved solids, which were calcined, weighed and sampled, these weighing 21.3 grams and containing 0.272 grams of Am-241.

The acidity of the solution was 4.09 M $H^+$ after dilution with water. The acidity was thereafter adjusted to 0.1 N to 0.3 N $H^+$ with concentrated ammonium hydroxide. Sufficient oxalic acid was added to precipitate the Am (1 gram oxalic acid per gram of Am) and leave the solution 0.1 M in oxalic acid (12 grams oxalic acid per liter of solution). The solution was then digested for 1 hour at 50° C. and then for about 16 hours at room temperature. After the digestion period, the solution was filtered to remove the americium oxalate which was then calcined to $AmO_2$ and the $AmO_2$ was sampled. The oxalate filtrate was sampled and found to contain 0.149 gram of Am. The product contained 6.45 grams of Am for a 92.9% Am recovery. Am metal may be prepared from the $AmO_2$, if desired, in generally known manner, e.g., by fluorinating the $AmO_2$ to $AmF_4$ and thereafter employing thermite reduction process to reduce the $AmF_4$ to metal, using a 30% excess of calcium and 0.75 to 1 mole of iodine ($I_2$) per mole of americium.

What is claimed is:

1. A method for separating americium values from bomb reduction residues created in the calcium reduction of americium tetrafluoride comprising dissolving soluble residues containing americium in a from about 10 M to about 15 M nitric acid solution, filtering insoluble residues therefrom, adjusting the acidity of the resulting filtrate to from about 0.1 N to about 0.3 N in hydrogen ion by adding ammonium hydroxide, thereafter adding sufficient oxalic acid to the filtrate to effect precipitation of americium oxalate and leave said filtrate at about 0.1 M in oxalic acid, digesting the resulting americium oxalate precipitate by heating for about one hour at about 50° C. and maintaining for from about 8 to about 16 hours at room temperature, separating said americium oxalate precipitate from said filtrate and calcining said precipitate to form americium oxide.

2. The method of claim 1 wherein said calcining is performed at about 600° C. for about four hours.

3. The method of claim 1 including further enriching the americium oxide of claim 1 by repeating said process steps of claim 1 in additional stages.

References Cited
UNITED STATES PATENTS

| | | | |
|---|---|---|---|
| 3,463,619 | 8/1969 | Ritter et al. | 423—10 |
| 2,577,097 | 12/1951 | Werner | 423—11 |
| 3,554,867 | 1/1971 | Thompson | 252—301.1 R |
| 2,681,923 | 6/1954 | Asprey et al. | 260—429.1 |
| 3,445,201 | 5/1969 | Wheelwright | 260—429.1 |
| 3,551,119 | 12/1970 | Werner | 252—301.1 R |

LELAND A. SEBASTIAN, Primary Examiner

F. M. GITTES, Assistant Examiner

U.S. Cl. X.R.

252—301.1 R; 260—429.1; 423—18, 250